T. F. SANBORN.
TUBE.
APPLICATION FILED JULY 24, 1911.
1,027,772. Patented May 28, 1912.
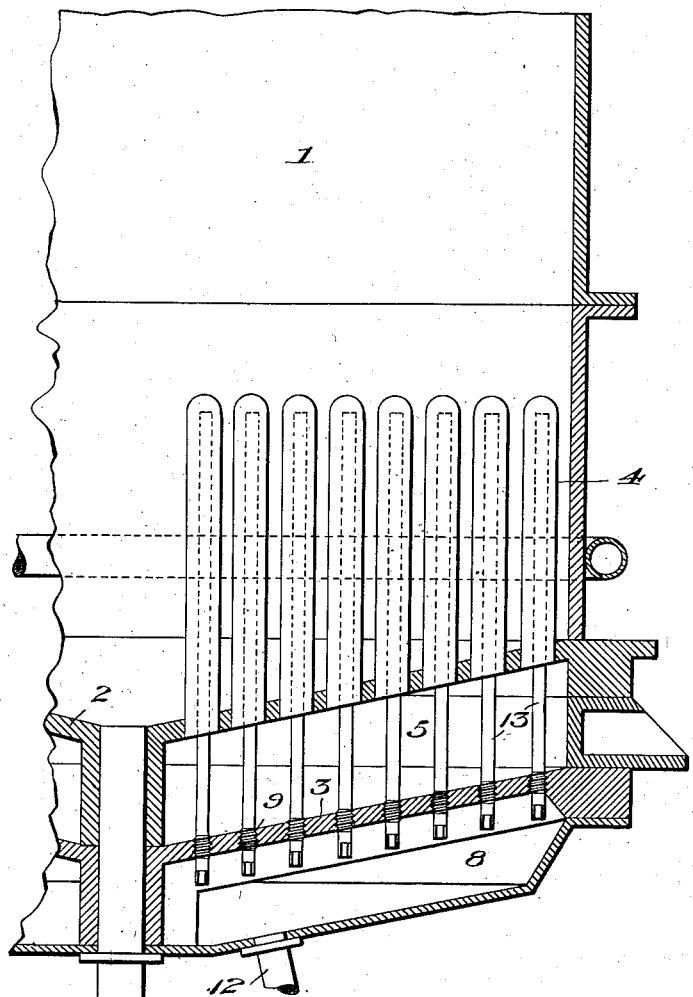
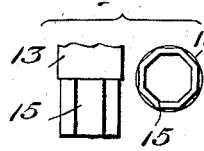
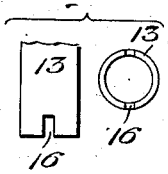
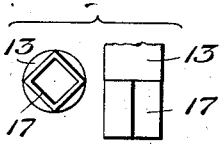

ial Neil. 640,351.

UNITED STATES PATENT OFFICE.

THORNTON F. SANBORN, OF ENSENADA, PORTO RICO.

TUBE.

1,027,772.  Specification of Letters Patent.  Patented May 28, 1912.

Application filed July 24, 1911. Serial No. 640,351.

*To all whom it may concern:*

Be it known that I, THORNTON F. SANBORN, a citizen of the United States, residing at Ensenada, Porto Rico, have invented certain new and useful Improvements in Tubes, of which the following is a specification.

This invention relates to tubes.

The present invention, while adapted for use wherever a tube or pipe is employed, is particularly designed for use in connection with the evaporating apparatus set forth in my application, Serial No. 599,773, and has for its object the provision of a pipe having novel means whereby it may be secured in position.

In the evaporating apparatus set forth in my aforesaid application, the take-off tubes or pipes through which the non-condensible gases are removed from the heating tubes, are relatively long and of relatively small diameter, and as they are used in large numbers, their securement in position is quite tedious. I have heretofore proposed to expand them into a head of the evaporating cell. In the present invention these tubes or pipes are provided with external screw threads of greater diameter than the tube or pipe itself and with suitable means for turning the tube or pipe in screwing it into position or removing it from the head whereby the securement of the tubes or pipes may be rapidly and easily performed. I wish it understood, however, that the present invention is not limited to tubes or pipes of the character set forth, as it may be used on other tubes or pipes, although it is particularly and peculiarly useful in connection with the evaporating apparatus, as above set forth.

In the accompanying drawings: Figure 1 is a section through a part of the evaporating apparatus set forth in my aforesaid application, illustrating tubes constructed in accordance with the present invention, in position; Fig. 2, a longitudinal section through one of the tubes; and Figs. 3, 4 and 5, detail views of some of the different end constructions for the tubes.

A part of an evaporating apparatus is shown at 1 as provided with tube sheet 2 and head 3, defining a steam chamber 5 and a chamber 8. The outlet for the cell 1 is shown at 10 and the heating tubes at 4. The outlet for the chamber 8 is designated 12.

The foregoing construction is the same as shown in my co-pending application on evaporating apparatus, and in that application there are shown take-off tubes or pipes 13. These tubes or pipes, in said application, are expanded into the head 3, and the present invention relates to an improved means of connecting them to the head 3. The tubes 13, in an evaporating apparatus, such as set forth in my aforesaid application, are very numerous, of considerable length, and of relatively small diameter. It is an expensive and tedious operation to expand these tubes into the head 3. To obviate this, I provide the tubes with external screw threads 9 which are formed by first forcing outwardly or expanding the tube where the threads are to be placed and then externally threading the expanded portion so that the threads appear on an enlarged part of the tube. Tubes of the character indicated have their walls of sufficient thickness to insure a proper rigidity of the tube despite its relative great length and this thickness of the wall of the tube permits its expansion and subsequent external threading. The screw-threaded part is of relatively short length and on account of its being of greater diameter than the tube, the tube can be very quickly and easily passed through the screw-threaded opening in the head 3 and the screw-threaded part 9 then engaged therewith.

To facilitate the turning of the tube, its lower end may be provided with a polygonal exterior 15 shown in side and end views, Fig. 3; or, the lower end of the tube may be notched as at 16, Fig. 4; or, a squared part 17 may be employed as shown in Fig. 5. Other formations than those shown in Figs. 3, 4, and 5, may be employed as any construction which will permit the engagement of a wrench, spanner, or tool will suffice.

Having thus described my invention, what I claim as new, and desire to secure by Letters Patent, is:—

1. A tube or pipe provided with an outwardly expanding part having an external screw-thread of greater diameter than the tube.

2. A tube or pipe provided with an outwardly expanding part having an external screw-thread of greater diameter than the tube, said tube being provided with tool engaging means.

3. A tube or pipe provided near one end with an outwardly expanding part having an external screw-thread of greater diameter than the tube and having its end, adjacent said screw-threaded part, provided with tool engaging means whereby the tube may be readily screwed into position.

In testimony whereof, I hereunto affix my signature in presence of two witnesses.

THORNTON F. SANBORN.

Witnesses:
S. V. LOCKWOOD,
WM. F. ASHTON.